United States Patent [19]

Kerfoot

[11] 4,115,512
[45] Sep. 19, 1978

[54] METHOD FOR REMOVING ARSENIC FROM COPPER AND/OR NICKEL BEARING AQUEOUS ACIDIC SOLUTIONS BY SOLVENT EXTRACTION

[75] Inventor: Derek G. E. Kerfoot, Edgware, England

[73] Assignee: Noranda Mines Limited, Toronto, Canada

[21] Appl. No.: 747,104

[22] Filed: Dec. 3, 1976

[51] Int. Cl.$^2$ .............................................. C01B 27/00
[52] U.S. Cl. ...................................... 423/24; 423/87; 423/139
[58] Field of Search ........................... 423/87, 24, 139; 75/101 BE

[56] References Cited

U.S. PATENT DOCUMENTS

| | | | |
|---|---|---|---|
| 3,473,919 | 10/1969 | Metcalfe et al. | 75/101 BE |
| 3,785,803 | 1/1974 | Moore | 75/101 BE |

FOREIGN PATENT DOCUMENTS

| | | | |
|---|---|---|---|
| 5,191,821 | 8/1976 | Japan. | |
| 778,663 | 7/1974 | U.S.S.R. | 423/544 |

OTHER PUBLICATIONS

Blake et al., "Solvent Extraction of Uranium and Other Metals by Acidic and Neutral Organophosphorus Compounds", pp. 289–298.

Primary Examiner—O. R. Vertiz
Assistant Examiner—Wayne A. Langel
Attorney, Agent, or Firm—Fleit & Jacobson

[57] ABSTRACT

A method is disclosed for removing arsenic by solvent extraction from a copper and/or nickel bearing aqueous solution containing about 100 to 600 gpl sulphuric acid. The method comprises contacting the solution with an organic solution consisting of about 5 to 80% by volume of tributylphosphate in an organic diluent, and subsequently stripping the arsenic from the loaded organic solution with a suitable stripping agent. Particularly, when the sulphuric acid concentration in the aqueous solution is lower than 300 gpl, the organic solution advantageously comprises up to about 15% of a quaternary ammonium reagent. Preferred quaternary ammonium reagents are tricaprylmethyl ammonium chloride and mixtures of tri-$C_8$–$C_{10}$ methylammonium chlorides.

12 Claims, 4 Drawing Figures

METHOD FOR REMOVING ARSENIC FROM COPPER AND/OR NICKEL BEARING AQUEOUS ACIDIC SOLUTIONS BY SOLVENT EXTRACTION

This invention relates to a method for removing arsenic from copper and/or nickel bearing aqueous acidic solutions by solvent extraction.

In the electrorefining of copper to produce cathodes of high purity from impure anode copper, certain impurity elements such as nickel, arsenic, antimony and bismuth dissolve in the copper bearing acidic electrolyte solution. Nickel is not unduly deleterious to the refining operation and can be tolerated at concentrations of up to 20-25 gpl. Antimony and bismuth do not present a great problem since they tend to regulate themselves in the system. Arsenic, however, is the major impurity in such solution, which must be controlled.

In order to maintain high operating current efficiencies and satisfactory cathode purity, it is necessary to control the concentrations of these impurities by continuously removing a portion of the electrolyte for purification. The electrolyte removed from the circuit for purification contains a high concentration of copper which must of course be recovered. The bleed solution is normally decopperized in one or more stages in electrowinning cells fitted with insoluble anodes. This decopperizing treatment results in the plating out of the major portion of the antimony and bismuth, and some of the arsenic together with the copper. Hydrogen contaminated with traces of the toxic gas arsine is also usually evolved during this operation, presenting a constant health and environmental hazard. Finally, the electrowon copper which is heavily contaminated with these impurities must be recycled to the anode furnace, or to the smelter, for purification. Obviously, therefore, this process does not result in the clean separation of arsenic from copper, but only increases the load of impurities circulating between the smelter and the refinery.

On the other hand, the removal of nickel presents no major difficulty, since the decopperized solution, consisting essentially of nickel sulphate-sulphuric acid solution, is concentrated by evaporation to precipitate crystalline nickel sulphate and the resulting liquor, typically 70% sulphuric acid containing low concentrations of nickel and arsenic, is returned to the electrorefining circuit.

In electrorefining, the dissolution of arsenic, antimony, and bismuth from the anodes into the electrolyte is not complete. Significant amounts of these elements collect in the anode slimes, along with essentially insoluble impurities such as selenium, tellurium, silver, gold and the platinum metals. The anode slimes are subsequently treated to recover these metal values and the residual liquor from these treatments can contain very high concentrations of arsenic and high concentrations of copper. It is therefore returned to the electrolyte purification circuit for treatment, thereby further contributing to the circulating load of arsenic in the smelter-refinery circuits.

It will, therefore, be appreciated that there is a need for an economic method of selectively removing impurities, particularly arsenic, from refinery electrolyte streams.

Applicant has now found that arsenic can be extracted from copper and/or nickel bearing aqueous solutions containing about 100 to 600 gpl sulphuric acid, by contacting such solution with an organic solution consisting of about 5 to 80% by volume, preferably 40-75% by volume, of tributylphosphate in an organic diluent, and subsequently stripping the arsenic from the loaded organic solution with a suitable stripping agent. Particularly at lower acid concentrations, the organic solution advantageously includes up to about 15%, preferably between 5 and 10%, of a quaternary ammonium reagent. Examples of the quaternary ammonium reagents are tricaprylmethyl-ammonium chloride, available commercially from General Mills Chemicals Inc., under the trade mark "Aliquat 336", and a mixture of tri-$C_8$-$C_{10}$ methylammonium chlorides, available commercially from Ashland Chemical Company, under the trade mark "Adogen 464".

A number of organic diluents can be used. These diluents are usually aliphatic or aromatic hydrocarbons or mixtures thereof. The most commonly used is kerosene. Others such as the ones known under the trade marks Escaid 100, Isopar K, Varsol DK3641, Shell 140 and Shell-Sol 715 are also available.

The preferred organic solution is a mixture of 40 to 75% by volume tributylphosphate and 5 to 10% by volume tricaprylmethylammonium chloride, in the organic diluent. Particularly good results have been obtained with a mixture of 60% by volume tributylphosphate and 5% by volume tricaprylmethyl-ammonium chloride, in Escaid 100 for the extraction of arsenic from a sulphuric acid solution containing 100 to 300 gpl sulphuric acid. Good results have also been obtained using tributylphosphate alone in an organic diluent for the extraction of arsenic from sulphuric acid solutions containing 300 to 600 gpl sulphuric acid.

The stripping of arsenic from the loaded organic solution into an aqueous phase can be readily achieved with water, with dilute sulphuric acid in the pH range of 0 to 1 or with dilute sodium hydroxide or sodium carbonate solutions.

The aqueous solution in both extracting and stripping should preferably be maintained at a temperature lower than 50° C. because of the flash point of some of the diluents. A particularly suitable temperature is about 25° C.

The invention will now be disclosed, by way of example, with reference to the following tests and attached drawings in which:

FIG. 1 gives a McCabe-Thiele diagram for the extraction of arsenic from a copper and nickel bearing sulphuric acid solution;

Solutions of tributylphosphate (TBP) and Aliquat 336 in various proportions in kerosene were evaluated in a two-stage extraction test in which a solution containing 27.0 gpl Cu, 3.02 gpl As, 0.22 gpl Sb, 56.8 mgpl Bi and 304 gpl $H_2SO_4$ was contacted successively with equal volumes of fresh organic solution at 25° C. in shake flasks for 60 seconds. The results are summarized in the following Table I:

TABLE I

| Organic Extractant | Arsenic Extraction (%) |
| --- | --- |
| 5 v/o* Aliquat + 15 v/o TBP | 22.5 |
| 5 v/o Aliquat + 30 v/o TBP | 41.5 |
| 5 v/o Aliquat + 45 v/o TBP | 42.7 |
| 5 v/o Aliquat + 60 v/o TBP | 61.2 |
| 5 v/o Aliquat + 75 v/o TBP | 73.5 |
| 10 v/o Aliquat + 10 v/o TBP | 27.1 |

*v/o = % by volume.

The results showed that arsenic extraction increased as the TBP concentration was increased. In addition, there was no extraction of copper or nickel.

Figure 1:
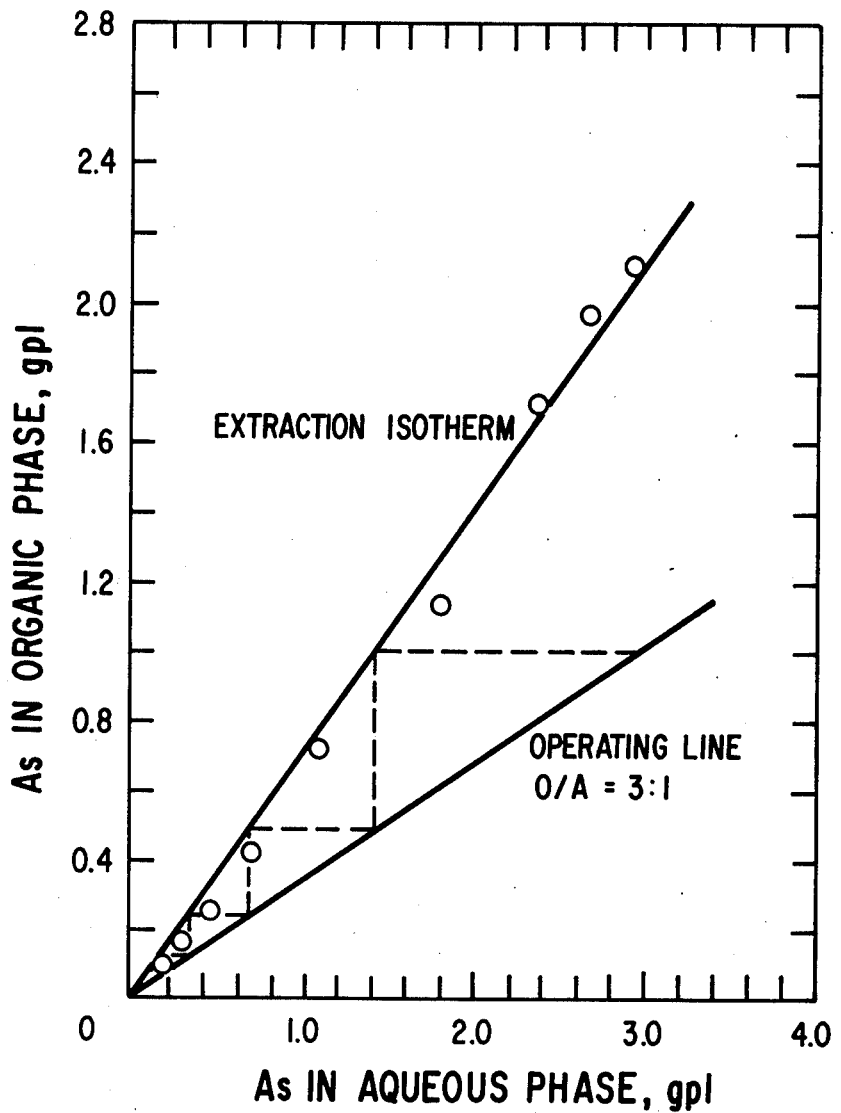

A solution of 60 v/o TBP + 5% v/o Aliquat 336 in kerosene was selected for further study. Shake flask tests were carried out at room temperature with a solution sample containing 28.2 gpl Cu, 2.96 gpl As and 255 gpl $H_2SO_4$ to obtain data for the construction of a McCabe-Thiele diagram illustrated in FIG. 1 of the drawings. The results showed that at an organic-aqueous phase volume ratio of 3:1, five theoretical extraction stages would be required to reduce the arsenic concentration of the feed electrolyte from 3 gpl to less than 0.2 gpl. The maximum loading of arsenic into the organic phase in equilibrium with the aqueous feed was determined to be 2.10 gpl As.

Batch simulations of a five-stage continuous countercurrent extraction of arsenic from the same sample of electrolyte solution, using the procedure described by Treybal (Liquid extraction, McGraw Hill, New York, 1963, page 359), at an organic to aqueous ratio of 3:1 and 2:1 with contact time of 60 seconds at 25° C., resulted in raffinates analyzing 0.12 gpl As and 0.21 gpl As, respectively as summarized in the following Table II:

TABLE II

| Stage No. | Organic/Aqueous 3:1 | | Organic/Aqueous 2:1 | |
| --- | --- | --- | --- | --- |
| | As Extraction % | As in Raffinate, gpl | As Extraction, % | As in Raffinate gpl |
| 1 | 56.5 | 1.29 | 38.9 | 1.81 |
| 2 | 78.0 | 0.65 | 66.6 | 0.99 |
| 3 | 89.9 | 0.30 | 79.4 | 0.61 |
| 4 | 92.9 | 0.21 | 87.5 | 0.37 |
| 5 | 95.9 | 0.12 | 92.9 | 0.21 |

Figure 2:
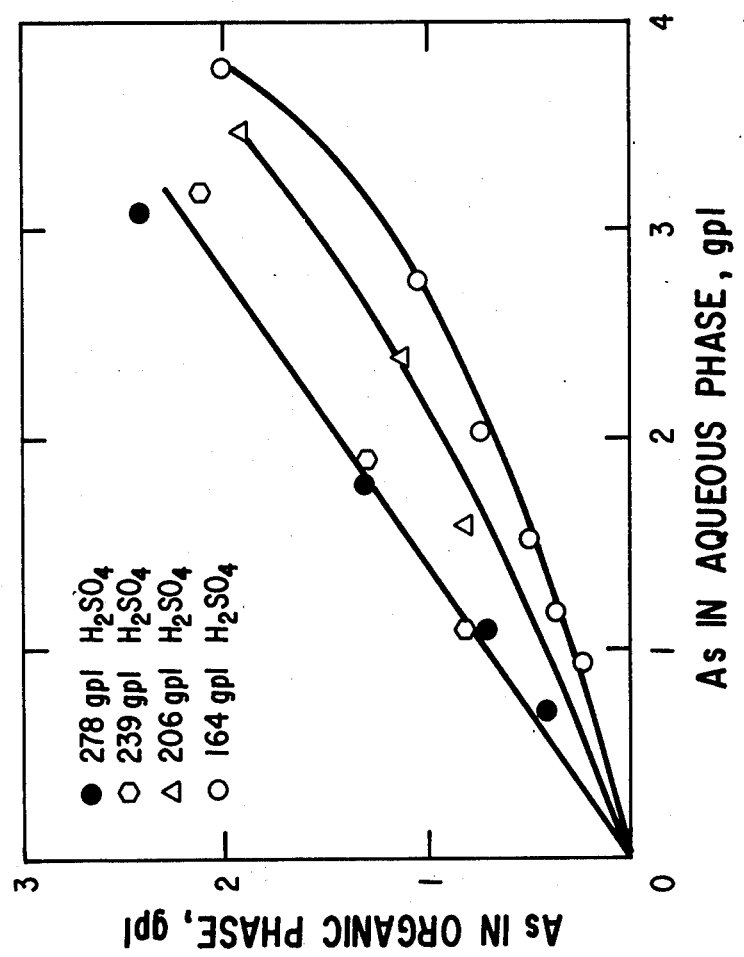
FIG. 2 illustrates extraction curves for the extraction of arsenic from copper and nickel bearing sulphuric acid solutions of various concentrations.

Further batch arsenic extraction tests were carried out with a sample of copper electrolyte solution analyzing 5.5 gpl As and 164 gpl $H_2SO_4$ to determine the effect of acid concentration. Sulphuric acid was added to the solution and extraction curves were developed for various acid concentrations. As discussed later, Escaid 100 (made by Imperial Oil Ltd.) was used as the organic diluent instead of kerosene. The data shown in FIG. 2 indicated that the arsenic distribution coefficient increased with increasing sulphuric acid concentration in the aqueous phase up to about 240 gpl $H_2SO_4$.

Preliminary screening of a number of diluents in shake flask tests showed that Escaid 100, Isopar K, Varsol DK 3641, Shell 140 and Shell-Sol 715 all had mass transfer and phase disengagement characteristics comparable to kerosene. Of these, Escaid 100 was preferred because of its high flash point (175° F.) and its proven use in copper solvent extraction plants.

Water, dilute sulphuric acid and sodium hydroxide solutions were evaluated as stripping agents for a loaded organic solution containing 60 v/o TBP + 5 v/o Aliquat 336 in kerosene. Water had a relatively poor phase disengagement characteristic. The other solutions showed relatively slow but acceptable phase disengagement rates. The results of the tests are given in the following Table III:

TABLE III

| | % ARSENIC STRIPPED | | | | | |
| --- | --- | --- | --- | --- | --- | --- |
| | Stripping Solution | | | | | |
| Stage No. | 1N NaOH | 0.1N NaOH | 5 gpl $H_2SO_4$ | 10 gpl $H_2SO_4$ | 20 gpl $H_2SO_4$ | 50 gpl $H_2SO_4$ |
| 1 | 89.8 | 82.5 | 79.5 | 78.8 | 80.5 | 85.2 |
| 2 | 96.2 | 95.0 | 96.1 | 96.2 | 96.1 | 96.5 |
| 3 | >99 | >99 | >99 | >99 | >99 | >99 |

The data showed that within the ranges tested the stripping of arsenic was insensitive to the sulphuric acid or sodium hydroxide concentration, and all the solutions tested could be used to strip arsenic from the loaded organic. Dilute sulphuric acid solutions are preferred as being more compatible with a copper refinery operation.

A subsequent batch simulation of countercurrent stripping with 10 gpl $H_2SO_4$ solution showed that 99% of the arsenic could be stripped in three theoretical stages at an organic to aqueous phase ratio of 1:1.

Figure 3:
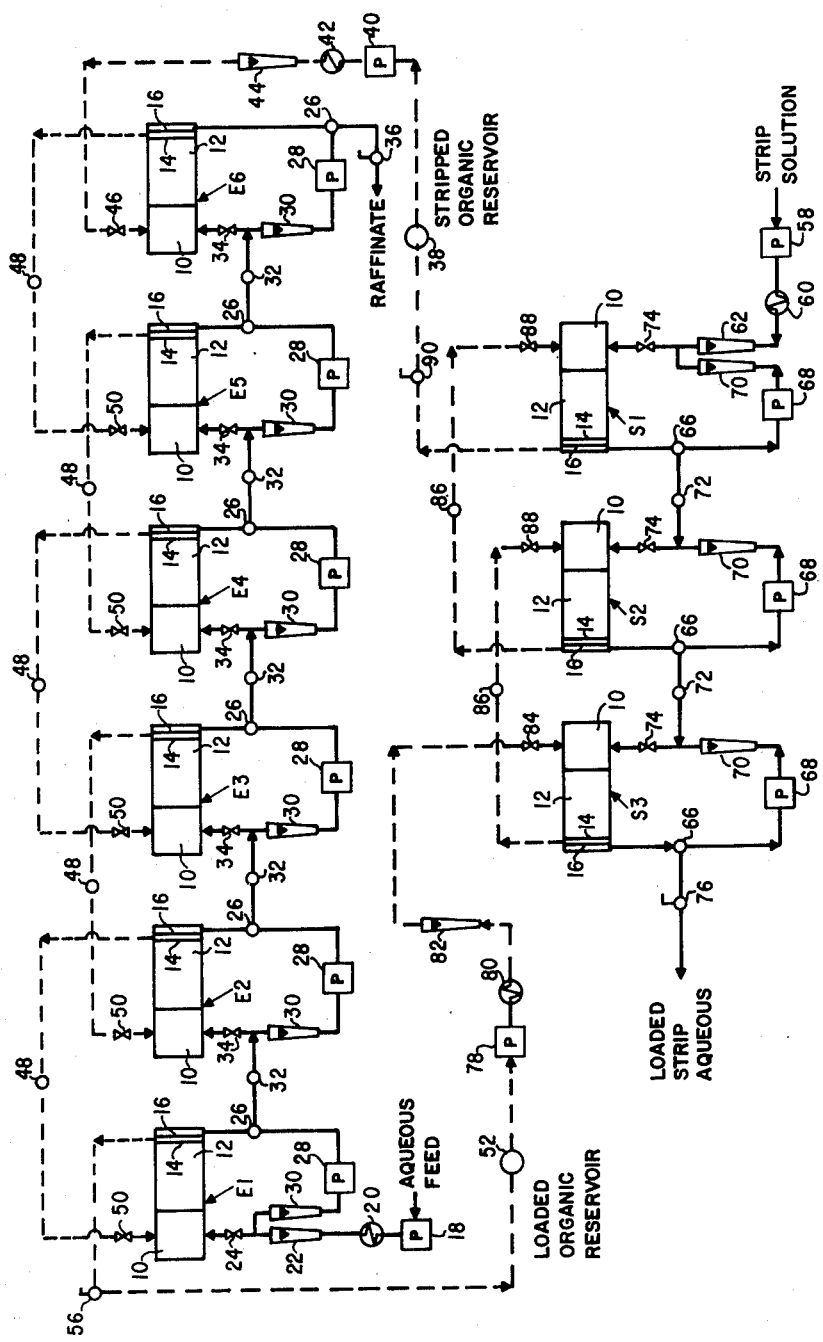
FIG. 3 illustrates a schematic diagram of a continuous multistage countercurrent extraction system for the extraction of arsenic from a copper and nickel bearing solution.

Pilot tests in a continuous solvent extraction circuit were also carried out. As shown in FIG. 3, the circuit consisted of six extraction stages E1 to E6 and three stripping stages S1 to S3. Each stage consisted of a mixer box 10 and a settler box 12 of standard design. The capacity of each mixer box was 500 ml. An impeller (not shown) was centered in each mixer box and the impeller tip speed was 400 ft/min. Each settler box was provided with organic and aqueous weirs 14 and 16 respectively for separating the respective phases in known manner.

The aqueous feed solution was a copper electrolyte solution containing 27.4 gpl Cu, 7.0 gpl Ni, 3.0 gpl As, 0.022 gpl Bi and 215 gpl $H_2SO_4$. The composition of the organic solution was 60 v/o TBP and 5 v/o Aliquat 336 in Escaid 100. The operating temperature of the aqueous feed to the first stage of both extraction and stripping was controlled at 25° C. by passing the solutions through heat exchangers. The overall organic to aqueous phase ratio was set at about 2.5:1 in both extraction and stripping.

The aqueous feed solution was fed continuously from a bulk storage to the mixer box 10 of the first extraction stage E1 by means of a pump 18 through heat exchanger 20, flowmeter 22 and valve 24. The aqueous phase overflowing the settler 12 of the first extraction stage E1 passed into a flow distributor 26 from which recycle solution was withdrawn by a pump 28 and transferred through a flowmeter 30 back to the mixer box. Since the mixers used for the test were operated at an organic to aqueous ratio of 1:1, a large recycle of aqueous phase from the settler underflow was essential to maintain the desired overall organic to aqueous ratio of 2.5:1. The remaining aqueous solution was transferred to the adjacent stage E2 by the primary action of its impeller through level controller 32 and valve 34. Circulation of the aqueous feed was then done from stage to stage through elements identified by the same reference characters. The aqueous phase overflowing the settler box of the last extraction stage E6 which was not recycled back to the corresponding mixer box flowed out of the system through a constant head 36 as the raffinate.

The organic phase was pumped from a reservoir 38 into the mixer box of the last extraction stage E6 by pump 40 through heat exchanger 42, flowmeter 44 and valve 46. The organic phase overflowing weir 14 of the extraction stage E6 was fed back to the mixer box of the previous extraction stage E5 by the pumping action of the impeller of stage E5 through level controller 48 and valve 50. Countercurrent flow of the organic phase was carried out from stage to stage. The loaded organic phase overflowing the first extraction stage was fed to a loaded organic reservoir 52 through a constant head 56.

The strip solution was a 15 gpl sulphuric acid solution and was continuously fed to the mixer box 10 of the first stripping stage S1 by pump 58 through heat exchanger 60, flowmeter 62 and valve 64. The strip solution overflowing weir 16 passed into a flow distributor 66 from which recycle solution was withdrawn by a pump 68 and transferred through a flowmeter 70 back to the mixer box. Since the same overall organic to aqueous ratio of about 2.5:1 was set for the stripping stage, a large recycle of stripping solution was also required to maintain the 1:1 ratio in the mixer box. The remaining strip solution was transferred to the adjacent stripping stage S2 by the pumping action of its impeller through level controller 72 and valve 74. Circulation of the strip solution was carried out from stage S2 to stage S3 by the elements identified by the same reference characters. The loaded strip aqueous solution overflowing the settler box of the last stage S3, which was not recycled back to the corresponding mixer box, came out of the system through a constant head 76 as the loaded strip aqueous solution. This solution can then be treated with slaked lime to precipitate calcium arsenate therefrom.

The loaded organic phase was pumped from reservoir 52 to the mixer box 10 of the last stripping stage S3 by pump 78 through heat exchanger 80, flowmeter 82 and valve 84. The organic phase overflowing weir 14 of stripping stage S3 was fed to the mixer box of stripping stage S2 by the pumping action of the impeller of stage S2 through level controller 86 and valve 88. Countercurrent flow of the organic phase was carried out in the same manner from stage S2 to stage S1. The stripped organic phase overflowing the settler of the first extraction stage S1 was fed to the organic reservoir 38 through a constant head 90.

A series of six tests was performed with the aqueous phase continuous to obtain data on mixer performance, settling characteristics and entrainment losses. Experimental conditions and results for two typical tests are given for the extraction and stripping sections in the following Tables IV and V respectively:

TABLE IV
CONTINUOUS PILOT PLANT TESTS EXTRACTION SECTION RESULTS

| Test No. | 1 | 2 |
|---|---|---|
| Mixer Retention Time, min. | 1.0 | 2.0 |
| Aqueous Feed, gpl As | 3.0 | 2.65 |
| Overall Organic/Aqueous | 2.64:1 | 2.60:1 |
| Operating Organic/Aqueous | 1:1 | 1:1 |
| Raffinate, gpl As | 0.31 | 0.34 |
| Loaded Organic, gpl As | 1.02 | 0.80 |
| % Arsenic Extraction | 89.7 | 87.2 |

TABLE V
CONTINUOUS PILOT PLANT TESTS STRIPPING SECTION RESULTS

| Test No. | 1 | 2 |
|---|---|---|
| Mixer Retention Time, min. | 1.0 | 2.0 |
| Strip Solution, gpl $H_2SO_4$ | 15.0 | 14.3 |
| Overall Organic/Aqueous | 2.46:1 | 2.37:1 |
| Operating Organic/Aqueous | 1:1 | 1:1 |
| Loaded Organic, gpl As | 1.02 | 0.80 |
| Stripped Organic, gpl As | 0.02 | 0.03 |
| % Arsenic Stripped | 98.0 | 96.3 |

The results indicated that a variation in retention time over the range 1.0 to 2.0 min. had little effect on extraction in the extraction and strip sections.

Phase disengagement rates were satisfactory in both the extraction and strip sections. The specific flow adopted as a safe design criteria for the extraction and strip settler sizes was 1.5 U.S. gal./min./ft$^2$.

The loaded strip aqueous solution can be trated by conventional methods, such as lime addition, to precipitate arsenic.

Treatment of the raffinate solution containing 0.3 gpl As in laboratory electrowinning cells simulating purification plant operating conditions has also demonstrated that the risk of arsine evolution is substantially reduced when compared to electrowinning of untreated electrolyte at 3 gpl As.

Batch tests were also conducted with a copper and nickel bearing sulphuric acid solution taken from the copper refinery purification circuit containing 13.7 gpl Cu, 4.6 gpl Ni, 57.8 gpl As, 0.45 gpl Sb and 3.4 mgpl Bi. The concentration of sulphuric acid was varied from 100 to 600 gpl and the organic solution used contained 50 v/o TBP in kerosene. The organic to aqueous phase ratio was 1:1. The results of these tests are shown in the following Table VI:

TABLE VI

| $H_2SO_4$ in Feed, gpl | Arsenic Extraction % |
|---|---|
| 100 | 10.4 |
| 200 | 15.1 |
| 300 | 19.7 |
| 400 | 24.8 |
| 500 | 33.6 |
| 600 | 39.0 |

The results demonstrated that arsenic extraction increased with increasing sulphuric acid concentration, from 10% at 100 gpl $H_2SO_4$ to 39% at 600 gpl $H_2SO_4$. Copper and nickel were not extracted at any of the acid concentration investigated. Stripping tests indicated that over 90% of the arsenic loaded on the organic phase could be stripped with water in a single stage to yield a copper-free solution at about pH 1.

Figure 4:
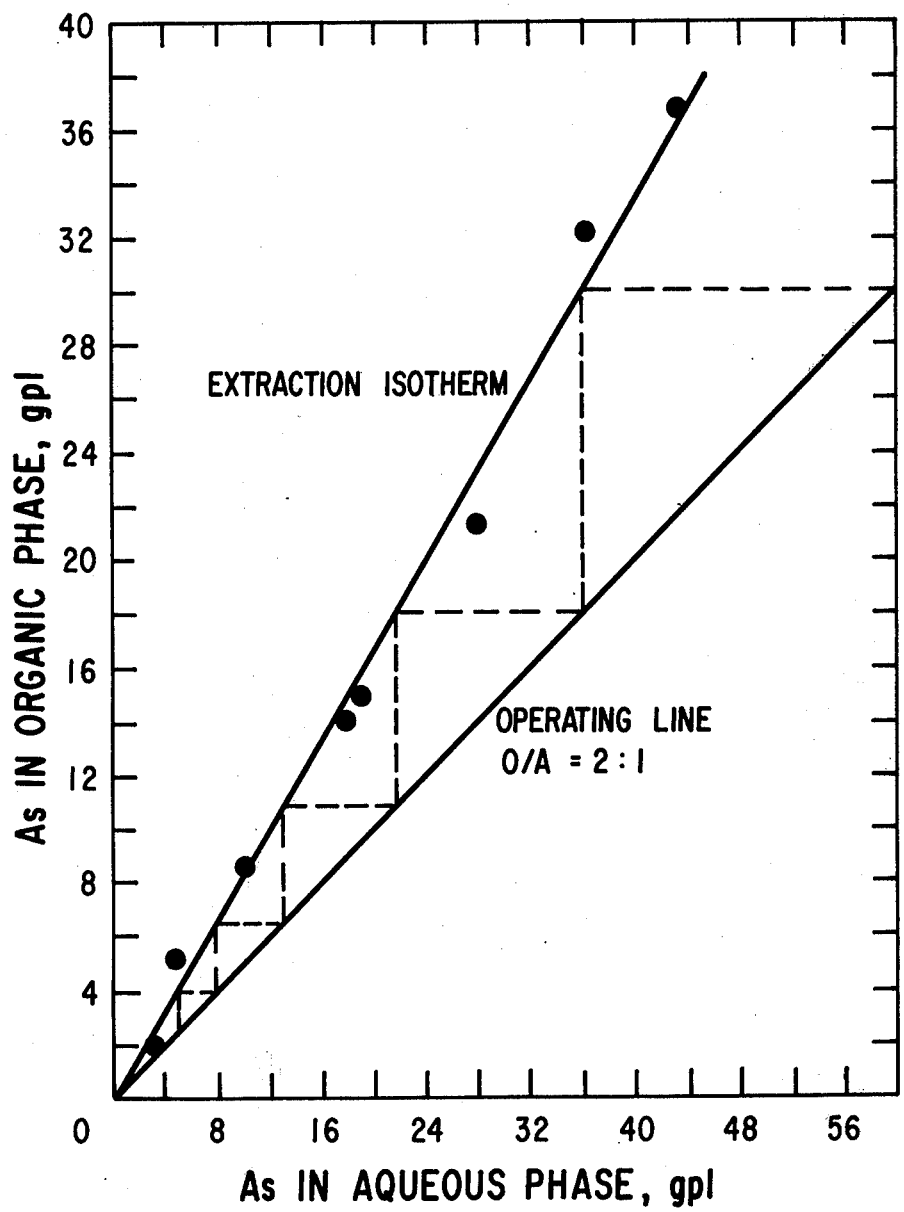
FIG. 4 gives another McCabe-Thiele diagram for the extraction of arsenic from specific copper and nickel bearing sulphuric acid solution.

A second sample of copper bearing solution containing 60 gpl As and 600 gpl $H_2SO_4$ was contacted with successive portions of fresh 50 v/o TBP in kerosene at an organic/aqueous ratio of 1:1 to obtain data for the construction of a McCabe-Thiele diagram as illustrated in FIG. 4. The results indicated that 90% of the arsenic could be removed in five theoretical extraction stages with an organic/aqueous phase ratio of 2:1. A subsequent batch simulation of a continuous countercurrent extraction system carried out at room temperature with 50 % TBP in kerosene, and a similar copper bearing solution (600 gpl $H_2SO_4$, 33.6 gpl As) at an organic to aqueous ratio of 2:1 resulted in an arsenic extraction of 97.6% in five stages.

In the above experiments, although nickel was present in all the feed solutions tested, it did not extract into any of the organic solutions investigated.

The results of the present invention have indicated that it is feasible to extract arsenic selectively from a copper and/or nickel bearing aqueous solution containing about 100 to 600 gpl sulphuric acid using an organic phase consisting of tributylphosphate in an organic diluent and then to strip arsenic from the loaded organic with a suitable stripping agent.

The chemistry of the arsenic extraction process has not been fully investigated but it is apparent from the tests carried out that the extraction of arsenic from an aqueous solution containing up to about 300 gpl sulphuric acid is more efficient when a quaternary amine is added in combination with tributylphosphate. Solutions containing 300–600 gpl sulphuric acid can be treated with tributylphosphate without adding the quaternary amine.

What is claimed is:

1. A method for removing arsenic by solvent extraction from a copper and/or nickel bearing aqueous solution containing about 100 to 600 gpl sulphuric acid, comprising contacting said solution with an organic solution consisting of about 5 to 80% by volume of tributylphosphate and a quaternary ammonium reagent in a positive amount up to about 15% by volume in an organic diluent, and subsequently stripping the arsenic from the loaded organic solution with a stripping agent.

2. A method as defined in claim 1, wherein said quaternary ammonium reagent is selected from tricaprylmethyl ammonium chloride and mixtures of tri-$C_8$-$C_{10}$ methylammonium chlorides.

3. A method as defined in claim 1, wherein the organic solution consists of about 5 to 80% by volume of tributylphosphate and about 5 to 15% by volume of quaternary ammonium reagent in an organic diluent.

4. A method as defined in claim 1, wherein the diluent is selected from the group consisting of aliphatic or aromatic hydrocarbons or mixtures thereof.

5. A method as defined in claim 4, wherein the diluent is kerosene.

6. A method as defined in claim 1, wherein the organic solution is a mixture of 40 to 75% by volume tributylphosphate and 5 to 10% by volume of the quaternary ammonium reagent, the balance being the organic diluent.

7. A method as defined in claim 6, wherein the copper and/or nickel bearing aqueous solution contains 100 to 300 gpl sulphuric acid.

8. A method as defined in claim 1, wherein extraction is done in a continuous multistage countercurrent circuit using a plurality of mixer-settler units.

9. A method as defined in claim 8, wherein the mixer-settlers are operated with the aqueous phase continuous.

10. A method as defined in claim 1, wherein the stripping agent is selected from the group consisting of water, dilute sulphuric acid and dilute sodium hydroxide or sodium carbonate solutions.

11. A method as defined in claim 10, wherein the aqueous solutions in both extraction and stripping are maintained at a temperature below 50° C.

12. A method as defined in claim 11, wherein the aqueous solutions are maintained at about 25° C.

* * * * *